United States Patent [19]

Bregeon et al.

[11] 4,033,814
[45] July 5, 1977

[54] THERMOGENIC SWIMMING-POOL TYPE NUCLEAR REACTOR

[75] Inventors: Louis Bregeon, Savigny-sur-Orge; Gérard Dupuy, Paris; Bernard Lerouge, Saint-Germain-en-Laye; Jean-Pierre Schwartz, Paris, all of France

[73] Assignee: Commissariat a l'Energie Atomique, Paris, France

[22] Filed: Aug. 29, 1975

[21] Appl. No.: 608,990

[30] Foreign Application Priority Data

Aug. 30, 1974 France .......................... 74.29646

[52] U.S. Cl. .................................. 176/63; 176/62; 176/65
[51] Int. Cl.² .............................. G21C 15/24
[58] Field of Search .................... 176/61–65

[56] References Cited

UNITED STATES PATENTS

| 3,285,824 | 11/1966 | Ageron | 176/62 |
| 3,308,032 | 3/1967 | Berthod | 176/61 |
| 3,393,127 | 7/1968 | Detman et al. | 176/61 |

FOREIGN PATENTS OR APPLICATIONS

| 1,224,251 | 6/1960 | France | 176/62 |
| 106,428 | 6/1965 | Norway | 176/50 |

*Primary Examiner*—Samuel W. Engle
*Assistant Examiner*—S. A. Cangialosi
*Attorney, Agent, or Firm*—McNenny, Pearne, Gordon, Gail, Dickinson & Schiller

[57] ABSTRACT

This invention relates to a thermogenic swimming-pool type nuclear reactor adapted to produce hot water for use in a heating installation.

The reactor comprises a generally cylindrical enclosure open at the top and filled with a cooling liquid. The enclosure is divided by a horizontal partition and the bottom zone below the partition contains the reactor core and at least one heat exchanger and at least one venturi. The cooling liquid is circulated between the outlet and inlet of the core through the heat exchanger and the venturi. At least one conduit extends through the partition so that its top end discharges into the upper zone and its bottom end discharges into an aperture formed in the wall of the venturi at its neck.

10 Claims, 4 Drawing Figures

THERMOGENIC SWIMMING-POOL TYPE NUCLEAR REACTOR

This invention relates to a thermogenic swimming-pool type nuclear reactor.

More specifically, the invention relates to a swimming-pool type nuclear reactor adapted to produce hot water at a temperature of about 120°, this water being used to supply a heating installation, for example, via a heat exchanger, or for water desalination.

It is known that a swimming-pool reactor is a relatively low-power nuclear reactor in which the fissile core is submerged at the bottom of an enclosure forming a water-filled pool. The pool water is used both as a heat-vehicle fluid for the dissipation of the heat evolved by the fuel elements and as a biological protection, a sufficient level of water being situated above the reactor core. Swimming-pool reactors of this kind are frequently used for irradiation purposes, for such reactors have many advantages due to their simplicity of operation and the facility of direct access to the core provided for the experimental systems requiring to be irradiated. Also, the risk of depressurization of the core is zero and the thick water cushion covering the fuel elements in the core acts as an effective filter to numerous fission products likely to be emitted.

The object of this invention is to convert a swimming-pool reactor of this kind so that it can deliver water at a temperature of about 110° to 120° C.

The problem to be solved is as follows: Since the reactor swimming-pool is open at the top it is practically impossible to obtain any appreciable water pressurization. Also, to obtain water at a mean temperature of about 120° at the outlet, the water pressure must be raised, during operation, to a value above 2 bars, for example about 4 bars, in order to control the thermohydraulic phenomena in the core. The problem to be solved is therefore to obtain the necessary excess pressure by simple means.

Some proposals have been made wherein the swimming-pool depth has been greatly increased in comparison with the conventional values, for example the height being 50 meters or even 160 meters. Although the desired excess pressure is obtained as a result of the hydrostatic pressure, such values naturally entail operating limits and result in investment costs greatly dependent upon the site conditions.

The invention relates specifically to a swimming-pool type reactor whereby water in liquid form at a temperature of between 110° and 120° C can be obtained at the core outlet while maintaining a reasonable height of water in the swimming-pool.

The thermogenic swimming-pool reactor of the invention is characterised in that it comprises a vertical-axis enclosure of a general cylindrical shape filled with a cooling liquid and open at the top, the said enclosure being divided into a top and bottom zone respectively by a horizontal wall which is thermally insulated and adapted to withstand an excess pressure, the said bottom zone containing the reactor core, at least one heat exchanger and at least one venturi and comprising means for circulating some of the cooling liquid between the core outlet and inlet through the said exchanger and the said venturi, the said reactor further comprising at least one conduit extending through said horizontal wall and discharging at the top end into the said top zone and, at its bottom end, into at least one aperture formed in the wall of the venturi or venturis at the neck thereof.

It has been found that the pressure required to give water at a temperature of the order of 115° C is obtained by passing the cooling water through a venturi. The venturi neck is subjected to a pressure equal to the hydrostatic pressure corresponding to the head of water in the enclosure above the neck. This pressure is obtained by a conduit discharging at the venturi neck, the conduit inlet being situated in the top zone of the enclosure.

In a preferred embodiment, each conduit extending through the said horizontal wall discharges into an annular space, the inner wall of which at least partly forms the said venturi, the said wall being in the form of a convergent section followed by a divergent section separated by a neck and being formed with apertures at said neck.

Preferably, the said core is surrounded by a cylinder, the top end of which is formed with apertures for the discharge of liquid after it has passed through the core, and the horizontal wall is formed by two parallel flat partitions secured to said enclosure and defining between them a space into which the apertures in the top part of the core cylinder discharge, the inlet apertures of each heat exchanger also discharging into said space.

According to the invention, the venturi or venturis can be oriented in various ways, the venturi neck, for example, being situated near the base of the enclosure of alternatively near the horizontal wall.

The core, the exchanger or exchangers and the venturi or venturis can also be arranged in various ways, in which case the sequence in which the cooling fluid circulated by at least one pump passes through the said elements depends upon the arrangement adopted, while if required the cooling liquid can be fed between two of such elements by means of baffles.

The invention will be more readily understood from the following description given by way of example of two embodiments of the invention. In the accompanying drawings.

Figure 1:
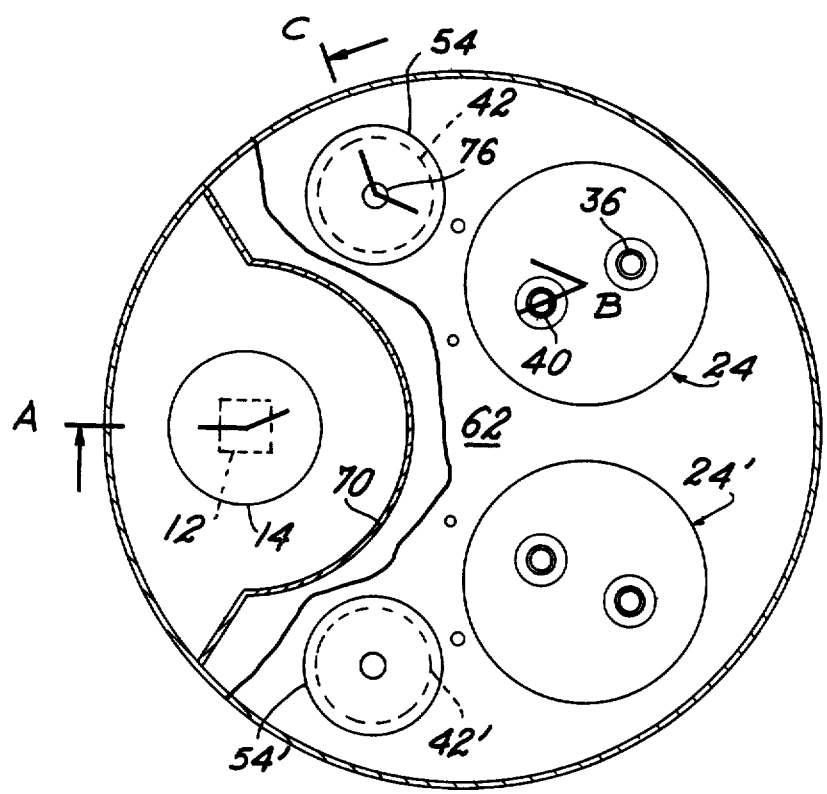
FIG. 1 is a horizontal section on the line D—D in FIG. 2, of a first embodiment of the reactor.

The complete installation is contained in an enclosure in the form of a cylindrical vessel 2 closed by a base 4 at the bottom and open at the top. In a variant, the top part may be closed by a floating cover 6. The enclosure also comprises a concreted caisson 8. The vessel 2 rests on the caisson 8 via a collar 10 secured to the top end of the vessel 4 and cooperating with a bearing surface 12 of the caisson 8.

The vessel 2 is filled with a cooling liquid (e.g. water) and the insulating plug 6 floats on the free surface of the liquid.

Figure 2:
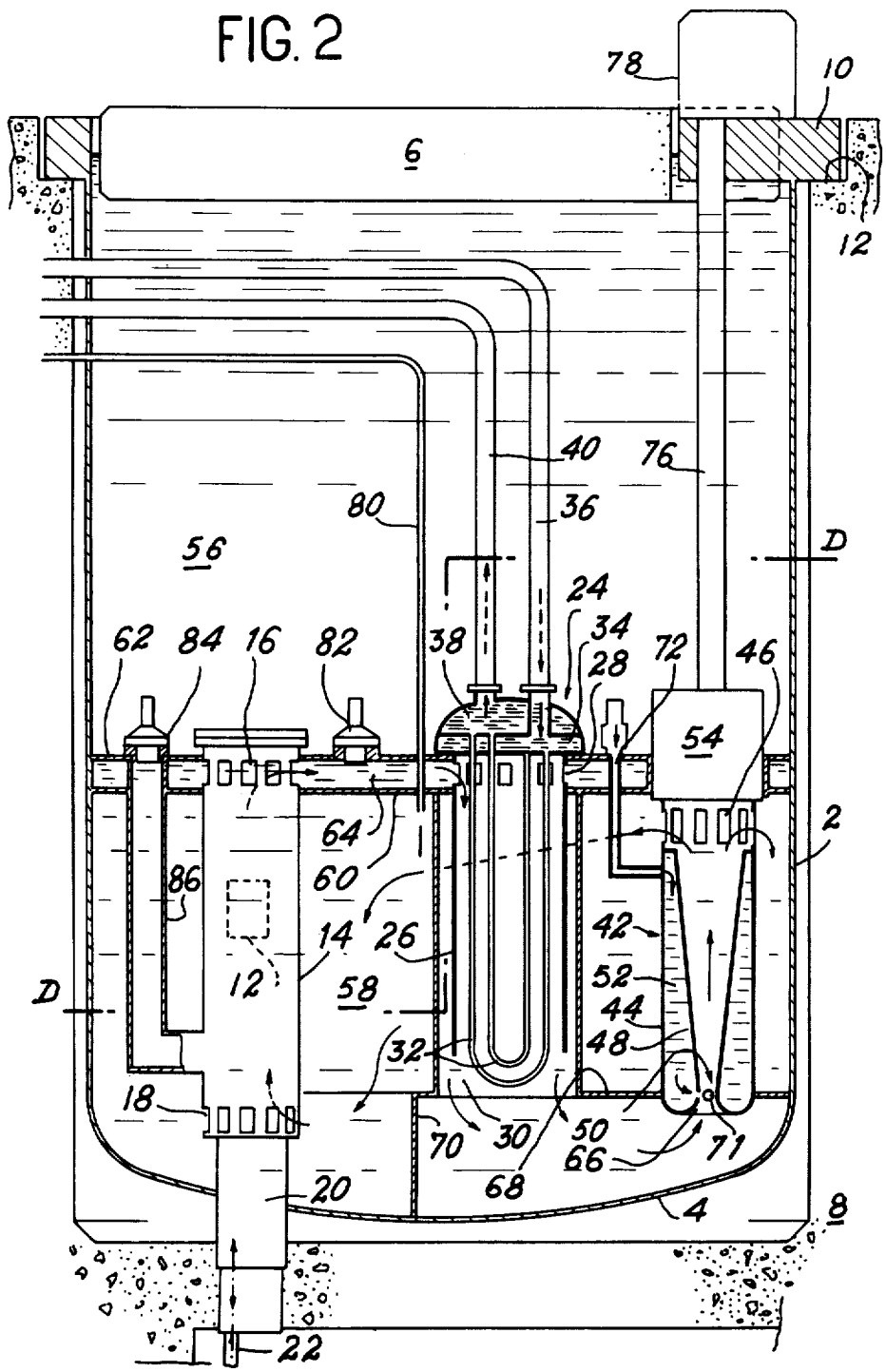
FIG. 2 is a vertical section of the reactor on the line A–B–C in FIG. 1.

Referring to FIG. 2, the vessel 2 contains a core 12 made up of fuel assemblies. The core is surrounded by a cylindrical member 14 or core cylinder, the top and bottom ends of which are formed with apertures 16 and 18 respectively for the discharge and introduction of the cooling liquid. Cylinder 14 continues in the form of a duct 20 which passes through the caisson 8 and which enables the control rods, e.g. 22, to be operated.

In the case of the reactor according to the first embodiment shown in FIGS. 1 and 2, the vessel 2 contains two heat-exchangers 24, 24' (only exchanger 24 is shown in FIG. 2). Exchanger 24 is shown diagrammatically with its outer cylindrical wall 26 inside which the primary liquid flows, the latter entering via top apertures 28 and leaving via bottom apertures 30. Inside the enclosure 26 are U-tubes, e.g. 32, in which the secondary water flows. The secondary water is introduced into the water tank 34 via the pipe 36 and is discharged from the water tank 38 via the pipe 40.

This reactor also contains two venturis 42 and 42' (only venturi 42 is shown in FIG. 2). Venturi 42 comprises an outer cylindrical wall 44 and an inner wall 48 giving the venturi shape with the neck 50. Between these two valls is an annular space 52. The venturi is connected to a pump 54 which feeds the water to the core via the apertures 46.

The interior of the vessel 2 is divided into two zones (a top zone 56 and a bottom zone 58) by a horizontal wall formed by the two horizontal partitions 60, 62. These are preferably strutted or braced to take the stresses due to the pressure differences in relation to the bottom and particularly the top zones. The two partitions define a space 64.

The reactor core cylinder 14, the exchangers 24 and the venturis 42 are suspended from the partitions 60 and 62. The apertures 16 in the core cylinder 14 and the apertures 28 in the exchanger 24 lead into the space 64 while the apertures 46 of the pump discharge below the bottom partition 60.

In addition, the cooling liquid leaving the apertures 30 in the exchangers 24 and 24' is fed to the inlets or convergent sections 66 of the venturis 42, 42' by means of the plates 68 and 70 secured to the vessel 2. In this reactor the necks 50 of the venturis 42 and 42' are situated near the base 4 of the vessel 2.

The annular space 52 of each venturi 42 communicates with the top zone 56 of the vessel 2 via at least one conduit 72 provided with a non-return valve and extending through the partitions 60 and 62. At the neck 50 of the venturi, apertures, e.g. 71 are formed in the inner wall 48. Thus all the hydrostatic pressure due to the head of water is applied to the neck 50 of the venturi. The pump 54 is driven by the shaft 76 actuated by the motor 78 secured to the outside of the vessel 2.

The operation of the water cooling circuit forming the primary circuit is as follows: Water enters the core cylinder 14 via the apertures 18 and leaves it via the apertures 16 after heating up in contact with the fuel assemblies. It then follows space 64 to enter the enclosure 26 of the exchanger 24 via the apertures 28. Here it gives up its heat to the secondary water flowing in the U-tubes 32. The water leaves the exchanger via the apertures 30 and enters the venturi 42 via the convergent section 66. It leaves via the apertures 46 in the pump and is re-introduced into the core cylinder 14 via the apertures 18. The only purpose of the pump 54 is to cause the water to flow in the primary circuit, making up the pressure losses in the core and the exchanger.

With the features according to the invention, the pressure at the venturi neck is fixed at a value equal to the hydrostatic pressure due to the head of water above the said neck which, in the case of the first embodiment, is substantially equivalent to the total head of water in the vessel 2. It is known that the dynamic excess pressure due to the venturi is proportional to the difference between the squares of the velocities of the liquid between the neck and the venturi inlet. The pressure at the venturi inlet is therefore greater than the hydrostatic pressure, the value of this pressure depending upon the shape of the venturi.

With this pressure increase, the pressure at the output of the core is still higher (plus the pressure losses in the exchanger), so that the water which has a temperature of the order of 115° to 120° C can be kept in the liquid state.

The space left between the reactor core and the exchangers is sufficient to prevent activation of the secondary water.

The bottomm part of the vessel (corresponding to the bottom zone 58) is made from stainless steel while the top part may be made from ordinary plated steel. Also, the water in the top zone 56 can be kept at a temperature below 75° C; it is not therefore necessary to provide a thermally insulating lining between the vessel 2 and the caisson 4 in this zone although this lining is essential in the bottom part.

The installation may also include a water purification circuit 80. The water is drawn from the bottom zone 58, separated, and then re-introduced into the top zone 56. Of course, as a variant, the water for purification could be drawn from the zone 64 at the core outlet. In this way it is possible to compensate for the water introduced into the bottom zone via the apertures 71. Natural convection valves 82 and 84 (associated with the conduit 86) enable the reactor core to be cooled by natural convection in the event of accidental stoppage of the pumps 54.

In the embodiment shown in FIGS. 1 and 2, the total height of the vessel is 15–18 meters and its diameter is about 6 meters. The installation comprises two primary exchangers and two venturis, but this number is without any limiting force and depends on the reactor power. Similarly, the primary exchangers are of the U-tube type and they could very well be replaced, for example, by straight-tube exchangers.

If desired, a low-power pump could be provided in the pipe 72 to increase the "hydrostatic" pressure.

Figure 3:
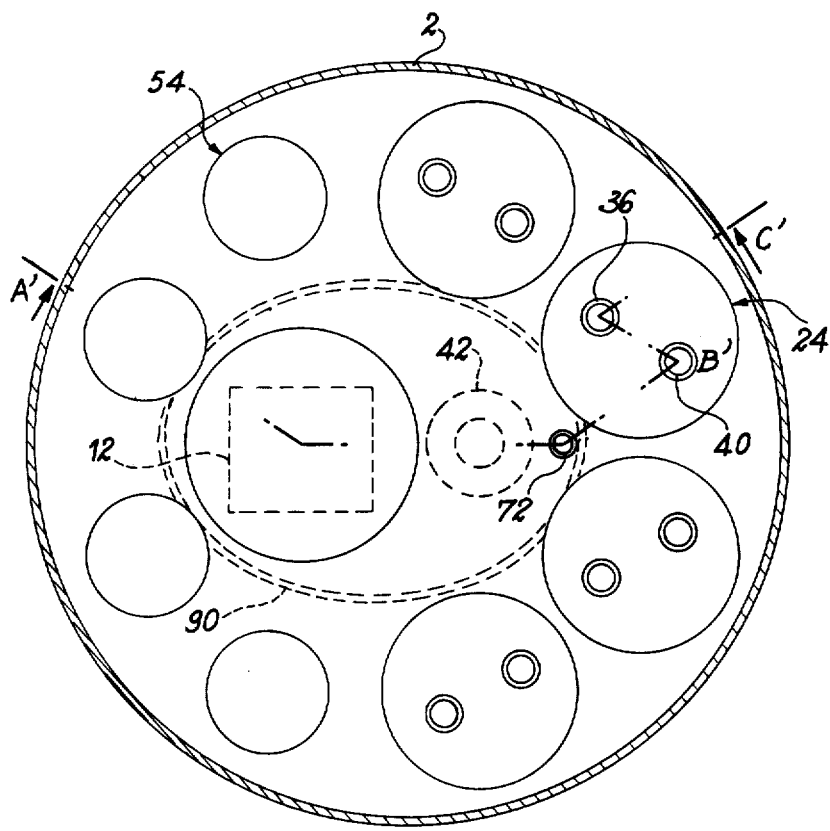
FIG. 3 is a horizontal section on the line D'—D' in FIG. 4 of the reactor according to the second embodiment.
Figure 4:
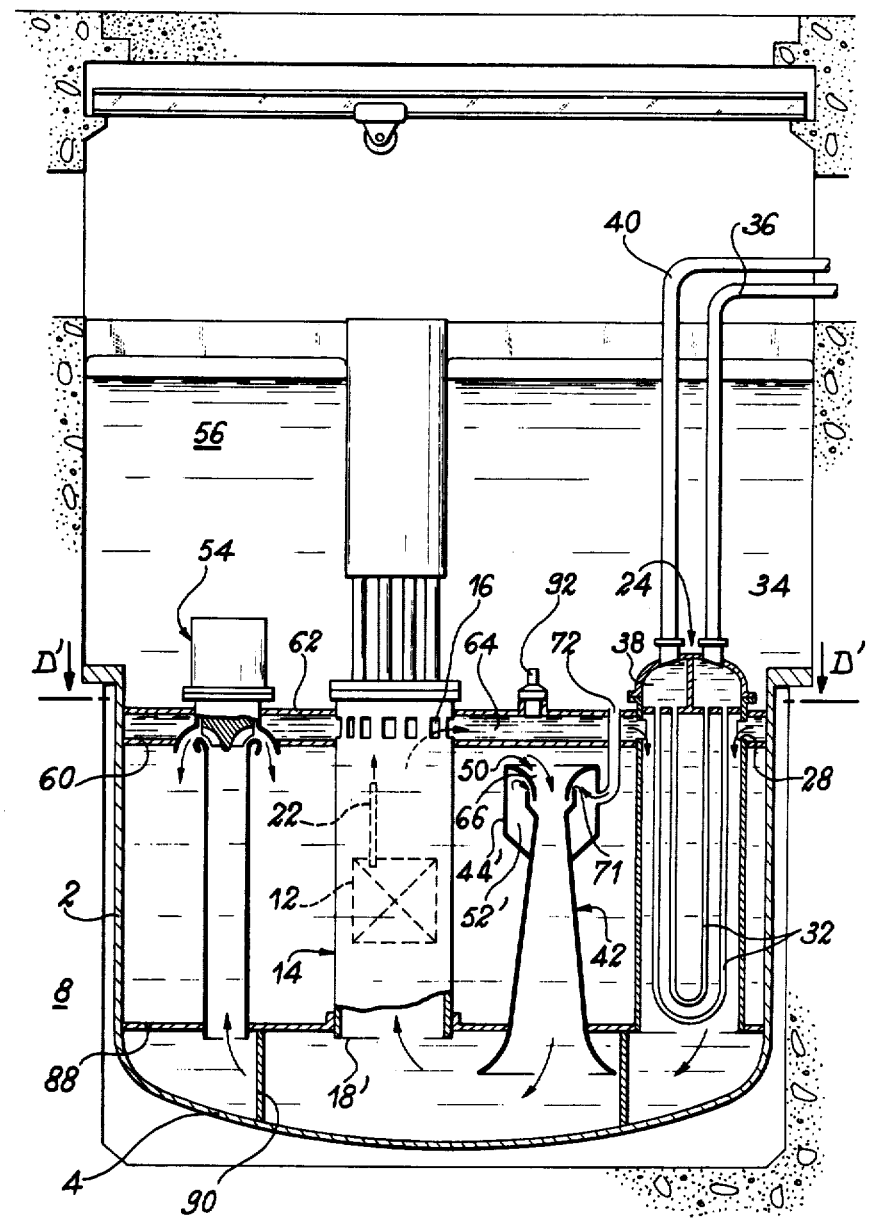
FIG. 4 is a vertical section of the reactor on the line A'–B'–C' in FIG. 3.

FIGS. 3 and 4 show the reactor of the invention according to a second embodiment differing essentially from the first in the number and arrangement of the exchangers, pumps and venturis. The arrangement of the second embodiment will allow the installation to be made more compact for a greater power and will facilitate the natural convection cooling of the core in the event of pump stoppage.

Of course, the reactor elements according to the second embodiment which are of an identical type to those of the first embodiment will be given the same references as in FIGS. 1 and 2.

Referring to FIG. 3, the core 12 is surrounded by the cylinder 14, the apertures 16 of which lead into the space 64 and inside which the control rods are subsequently introduced via the top part.

In this reactor, the vessel 2 contains four heat exchangers, such as the exchanger 24 in FIG. 4, four pumps, e.g. pump 54, and a venturi 42, the exchangers 24 and the pumps 54 being disposed at the periphery of the vessel 2 around the core 12 and the venturi 42.

The venturi 42 is arranged vertically in the vessel 2 with its neck 50 disposed near the bottom partition 60. The said neck 50, formed with apertures 71, communicates with the top zone 56 of the enclosure via the annular chamber 52' bounded around said venturi 42 by the wall 44' secured to the latter and the conduit 72 leading via one of its ends into said chamber 52' and via its other end into the said zone 56.

A horizontal plate 88 secured to the vessel 2 and a cylindrical cylinder 90 secured to the base 4 of the vessel 2 and the said plate 88 separate the core 12 and the venturi 42 from the exchangers 24 and the pumps 54 in the bottom part of the vessel 2, the exchangers 24, pumps 54, core 12 and venturi 42 extending through said plate 88. Thus the cooling water can be fed to the inlet of pump 54 when it leaves exchanger 24 and to the inlet of core 12 when it leaves the venturi 42.

It will be seen that the top partition 62 is provides with a valve 92 whereby it can on its own cool the core 12 by natural circulation in the event of accidental stoppage of the pumps 54.

The operation of the water cooling circuit is therefore as follows: After the water has passed through the apertures 16 on leaving the core 12 it enters the exchanger 24 via the apertures 28 inside which it gives up its heat to the secondary water flowing in the U-tubes 32.

The water at the outlet of the exchanger 24 is fed to the pump 54 through which it passes before entering the venturi 42 via the covergent section 66. After passing through the said venturi 42, which produces the required excess pressure, the water is fed to the inlet of the core 12.

We claim:

1. A thermogenic swimming-pool type nuclear reactor, characterized in that it comprises a vertical-axis enclosure of a general cylindrical shape filled with a cooling liquid and open at the top, the said enclosure being divided into a top and a bottom zone respectively by a horizontal wall, the bottom zone containing a reactor core having a core inlet and a core outlet, at least one heat exchanger, at least one venturi each venturi being provided with a wall and an outlet and an inlet and a neck and at least one aperture formed in the wall of the venturi at the neck of the venturi, and pump means for circulating some of the cooling liquid between the core outlet and the core inlet through the exchanger and the venturi, the reactor further comprising at least one conduit extending through said horizontal wall and opening at a top end into the top zone and, at a bottom end, into the aperture formed in the wall of the venturi.

2. A reactor according to claim 1, characterized in that each conduit extending through the said horizontal wall discharges into an annular space, the inner wall of which at least partly forms the venturi, the inner wall being in the form of a convergent section followed by a divergent section separated by a neck and being formed with the aperture at said neck.

3. A reactor according to claim 1, characterized in that the core is surrounded by a core cylinder, the top end of which is formed with apertures for the discharge of liquid after it has passed through the core, and the horizontal wall is formed by two parallel flat partitions secured to said enclosure and defining between them a space into which the apertures in the top of the core cylinder discharge, inlet apertures of each heat exchanger opening into the space.

4. A reactor according to claim 1, characterized in that a primary circuit situated in the bottom zone of the enclosure communicates with the top zone, which is filled with tepid water at a temperature of less than 75° C, only via small-section pipes in which a downflow is maintained by the extraction of the water.

5. A reactor according to claim 1, characterized in that the neck of the venturi is adjacent the base of the enclosure.

6. A reactor according to claim 5, characterized in that at the outlet of the exchanger the cooling liquid is fed to the inlet of the venturi via a system of baffles.

7. A reactor according to claim 1, characterized in that the neck of the venturi is adjacent the horizontal wall.

8. A reactor according to claim 7, characterized in that the outlet of the said venturi the cooling liquid is fed to the core inlet via a system, of baffles.

9. A reactor according to claim 6, characterized in that a top partition forming the horizontal wall is provided with a valve and a core cylinder is connected at its bottom part to a conduit extending in sealing-tight relationship through the horizontal wall and the conduit is provided with a valve at its end discharging into the top zone.

10. A reactor according to claim 8, characterized in that a top partition forming the horizontal wall is provided with a valve.

* * * * *